Patented Apr. 12, 1927.

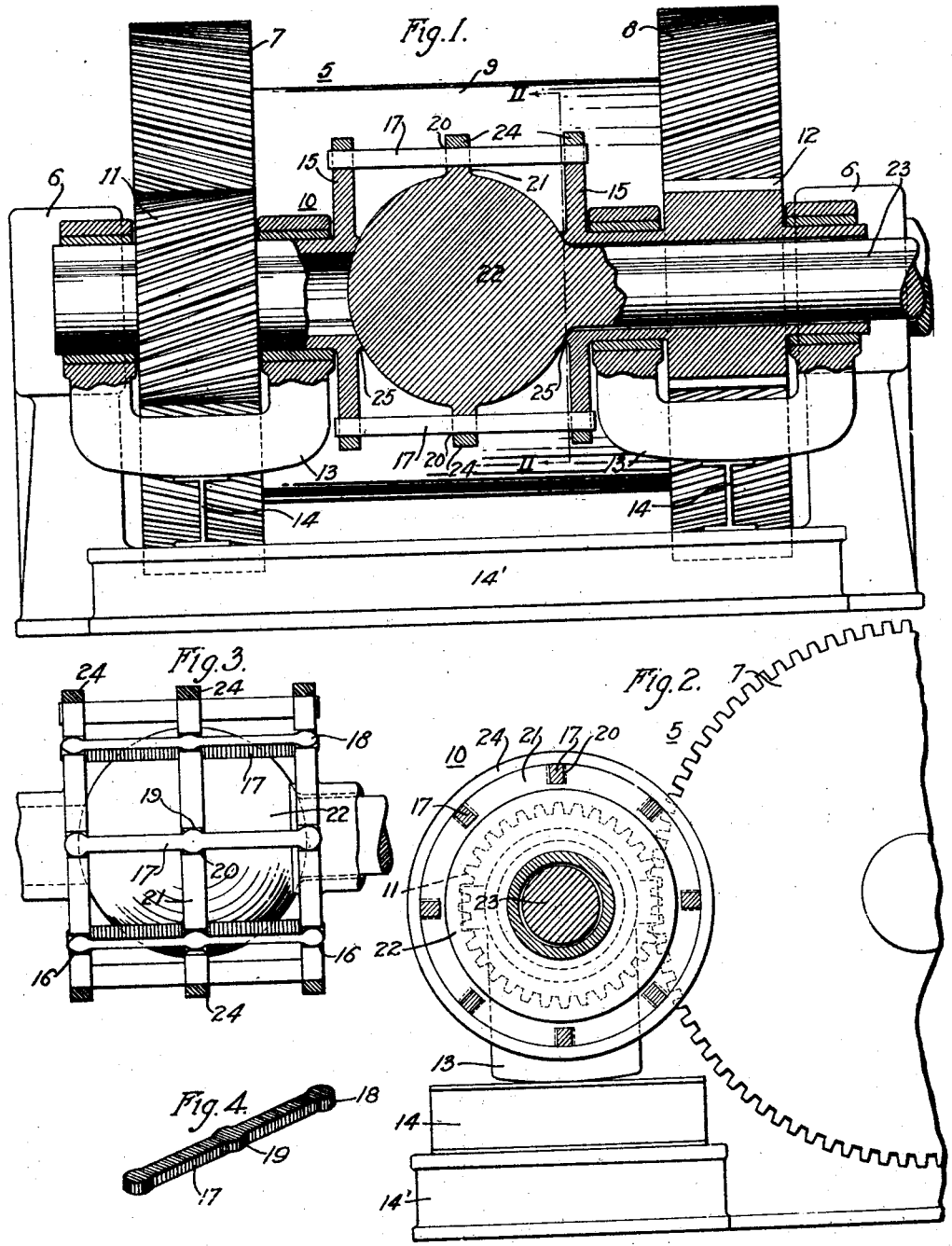

1,624,416

UNITED STATES PATENT OFFICE.

ALLIS M. MacFARLAND, OF WILKINSBURG, PENNSYLVANIA, ASSIGNOR TO WESTINGHOUSE GEAR AND DYNAMOMETER COMPANY, A CORPORATION OF PENNSYLVANIA.

REDUCTION GEARING.

Application filed October 30, 1920. Serial No. 420,719.

This invention relates to reduction gearing, and particularly to that class of helical gearing used, for example, to transmit power from a steam turbine operating at relatively high speed to a ship propeller or electric generator which is designed to operate effectively at a lower speed, and it has for an object the provision of a reduction gearing wherein the power of the turbine is transmitted to the reduction gear with uniform pressure throughout the length of the teeth in engagement with the pinion.

Because of the high ratio of speed reduction required in the class of service referred to, it is customary to employ pinions of small diameter and in order to provide teeth of sufficient strength to withstand the pressures incident to high power transmission, the pinions and the teeth thereon are made relatively long and consequently flex under the strains imposed thereon. If the pinion were supported in rigid bearings, the torsional strains would flex the pinion and teeth sufficiently to greatly reduce the contacting surfaces of the teeth and thereby impose the entire load upon a relatively short section thereof. This condition causes excessive and uneven wear of the teeth and ultimate failure of the pinion. To obviate this difficulty, gearing has been constructed wherein the pinion is flexibly supported so that it may accommodate its axial position to the degree of torsional deflection of the pinion and thereby maintain a substantially uniform pressure throughout the length of the teeth.

It is the usual practice, where relatively large reduction ratios are necessary, to divide the pinion and gear into two sections, the helical teeth of each section being inclined in opposite directions so as to balance the end thrust of the inclined teeth. The usual practice has been to separate the toothed sections a sufficient distance that a central pinion bearing may be accommodated between them, the end bearing and the central bearing being mounted upon the same floating frame.

A detailed object of this invention is to produce a pinion which may readily assume various relative axial positions with respect to the axis of the reduction gearing and thereby insure substantially uniform pressure distribution over the length of the pinion.

Another detailed object is to provide a pinion having two separate pinions which may assume various relative axial positions independently of one another and at the same time transmit equal powers to the gear.

Another detailed object is to provide a pinion having two separate pinions capable of independent axial adjustment and which are driven from a point between the pinions and whereby the driving stresses are applied with equal intensity to corresponding points of each of the pinions.

These and other objects which will be made apparent throughout the further description are attained in the construction embodying my invention and illustrated in the accompanying drawings, wherein:—

Fig. 1 is a side elevation of a reduction gearing, showing portions of the pinion frame and pinion in vertical section.

Fig. 2 is an end elevation of the gearing, showing the pinion in transverse section, taken on the line II—II of Fig. 1.

Fig. 3 is a side elevation of a fragment of the pinion.

Fig. 4 is a perspective view of an equalizing bar employed in the pinion construction.

Referring to the drawings, I show a reduction gear 5 which is mounted upon bearings 6 and which is provided with two sets of helical teeth 7 and 8 disposed in spaced relation and rigidly connected by a central hub 9. Because of the relatively large proportions of the reduction gear compared with those of the pinion with which it cooperates, the gear 5 is considered to be rigid and is not appreciably distorted by such strains as ordinarily cause the small pinion to twist.

The pinion 10 includes a pair of separate pinions 11 and 12, which are provided with helical teeth adapted to mesh with the oppositely inclined teeth of the sets 7 and 8, respectively. Each pinion is mounted in a separate bearing frame 13 which is flexibly supported upon a flexible I-beam 14 in such manner that it is free to oscillate and permit the pinion supported thereby to assume various angular positions with respect to the axis of the gear 5. The I-beams are supported upon a suitable rigid base 14'. The pinions which are normally axially aligned and disposed parallel to the axis of the gear 5 are provided at their adjacent ends with flanges 15 which are provided with radially disposed slots 16 cut into the periphery of the flange in equi-distant relation. As shown, there are eight of these slots on each flange adapted to receive the ends of as many equalizing bars 17 which extend from one flange to the other and form a flexible connection between the pinions.

The pinions are identical in size and shape so that the distortion is substantially equal in both pinions, and provision is made for driving them from adjacent ends of the pinion. The pinions are hollow and the driving shaft 23 which is attached to the turbine extends through one of them and terminates in a spherical end portion 22 which is disposed between the adjacent ends of the pinions. The teeth of the gearing are inclined so that the end thrust tends to move the pinions toward one another and the inner ends of the pinions are provided with spherical bearing seats 25 adapted to bear against the spherical end of the portion of the shaft and permit axial displacement of the pinion with respect to the axis 23. The construction is compact and provides a more flexible mounting for the pinion than has heretofore been found practicable.

The equalizing bars 17 are provided, as shown in Figs. 3 and 4, with cylindrical or convex side surfaces 18 adjacent their extremities and with similar cylindrical or convex side surfaces 19 at their centers, the surfaces of the extremities of the bars being adapted to seat within the slots 16 in such manner that relative angular movement of the pinions is permitted within certain limits. The cylindrical surfaces 19 are adapted to seat within radial slots 20 cut in the periphery of the flange 21, carried upon the spherical end portion 22 of the driving shaft 23. The slots 20 are cylindrical or internally concave in shape and provide bearings for the equalizing bars 17 which prevent longitudinal movement of the bars with respect to the flange 21, but permits of their oscillation within certain limits. The bars are retained in the respective flanges by suitable bands 24, placed upon the flanges after the bars have been assembled therein.

In effect, the coupling thus described operates in a manner similar to that of the coupling for differential shaft drives and may, therefore, be termed a "differential coupling." The equalizing bars 17 are adapted to be driven by the drive shaft 23 through the medium of the flange 21 carried upon the spherical end of the shaft, and the bars in turn transmit equal torques to the flanges 15 carried by the pinions.

It will be seen from the foregoing that should there be any inaccuracy in the cutting of the teeth such as would create a tendency of one gear to assume a greater load than the other, the pressure on the teeth of both pinions would be equalized through the reaction of the equalizer bars. The pinions, therefore, are free to assume various relative angular positions and because the pinions are mounted in frames which are free to oscillate, they are also free to assume relatively different axial positions and consequently the pinions under stress will automatically assume such positions as will equalize the load on each pinion and uniformly distribute the load over the entire length of the teeth.

Throughout this specification, I have described a cylindrical seative relation between the levers 17 and the respective flanges but if a more universal flexibility be desired, the respective seats may be spherical in nature, as shown in detail in my Patent No. 1,495,703 filed October 30, 1920, and assigned to the Westinghouse Gear and Dynamometer Co.

While I have described and illustrated but one embodiment of my invention, it will be apparent to those skilled in the art that various changes, modifications, substitutions, additions and omissions may be made in the apparatus illustrated without departing from the spirit and scope of the invention as set forth by the appended claims.

What I claim is:—

1. Gearing comprising a gear having two sets of oppositely inclined helical teeth, a pair of separate pinions mounted for relative rotary movement and relative axial movement, provided with oppositely inclined helical teeth adapted to engage separate sets of teeth on the gear, the teeth being inclined so that the pinions are moved toward one another by the longitudinal thrust of the inclined teeth, a shaft extending through one of the pinions and having a thrust member adapted to limit the longitudinal movement of the pinions and permit movement of the axis of the pinion into angular relation with the axis of the shaft, and a driving connection pivotally connecting the pinions permitting relative rotary movement of the pinions and pivotally engaging the shaft at a point between the pinions.

2. In a system of gearing comprising a gear having sets of oppositely inclined helical teeth thereon and helically toothed pinions meshing respectively with said sets of gear teeth, the combination of a power shaft, a spherical enlargement on said shaft for receiving thrust from adjacent pinions, equalizing members pivotally secured to said enlargement and slidably connected to adjacent pinions for equally distributing power transmitted by the shaft to the pinions, the spherical surface of said enlargement being exposed, whereby said surface may be inspected without disturbing the coupling.

3. Gearing comprising a gear having two rows of teeth, separate pinions having teeth meshing with the gear teeth, an equalizing connection provided between the pinions, bearings on opposite sides of each pinion for supporting the same, common means for supporting the bearings for each pinion in horizontal alignment, said means adapted to rock upon supporting means at a point outside the confines of any bearing, whereby the horizontal alignment of said bearings may be disturbed without disturbing the axial alignment of said bearings.

4. Gearing comprising a gear having two rows of teeth, separate pinions having teeth meshing with the gear teeth, an equalizing connection provided between the pinions, bearings on opposite sides of each pinion for supporting the same, common means for supporting the bearings for each pinion in horizontal alignment, said means adapted to rock upon flexible supporting means at a point outside the confines of any bearing, whereby the horizontal alignment of said bearings may be disturbed without disturbing the axial alignment of said bearings, and the point about which said common means is adapted to rock may also be varied.

In testimony whereof, I have hereunto subscribed my name this 27th day of October, 1920.

ALLIS M. MacFARLAND.